(12) United States Patent
Sundholm et al.

(10) Patent No.: US 11,001,736 B2
(45) Date of Patent: May 11, 2021

(54) ADHESIVE POLYMER COMPOSITION

(71) Applicant: Borealis AG, Vienna (AT)

(72) Inventors: Tua Sundholm, Porvoo (FI); Juha Hartikainen, Kerkkoo (FI); Jouni Purmonen, Porvoo (FI); Ravindra Tupe, Porvoo (FI); Juha Kuosa, Helsinki (FI); Liubov Havula, Espoo (FI)

(73) Assignee: BOREALIS AG, Vienna (AT)

( * ) Notice: Subject to any disclaimer, the term of this patent is extended or adjusted under 35 U.S.C. 154(b) by 57 days.

(21) Appl. No.: 16/494,885

(22) PCT Filed: May 24, 2018

(86) PCT No.: PCT/EP2018/063599
§ 371 (c)(1),
(2) Date: Sep. 17, 2019

(87) PCT Pub. No.: WO2018/219762
PCT Pub. Date: Dec. 6, 2018

(65) Prior Publication Data
US 2020/0040235 A1 Feb. 6, 2020

(30) Foreign Application Priority Data
May 31, 2017 (EP) ..................... 17173681

(51) Int. Cl.
| | | |
|---|---|---|
| *C09J 151/06* | (2006.01) | |
| *B32B 7/12* | (2006.01) | |
| *C08L 23/08* | (2006.01) | |
| *C08L 23/16* | (2006.01) | |

(52) U.S. Cl.
CPC .............. *C09J 151/06* (2013.01); *B32B 7/12* (2013.01); *C08L 23/08* (2013.01); *C08L 23/16* (2013.01); *B32B 2597/00* (2013.01); *C08L 2205/02* (2013.01); *C09J 2301/414* (2020.08); *C09J 2423/04* (2013.01); *C09J 2451/00* (2013.01)

(58) Field of Classification Search
CPC ................ C09J 151/06; C09J 2301/414; C09J 2423/04; C09J 2451/00; C08L 23/08; C08L 23/16
See application file for complete search history.

(56) References Cited

U.S. PATENT DOCUMENTS

2011/0045295 A1* 2/2011 Vogt ........................ B32B 15/18
428/375
2013/0085221 A1 4/2013 Botros et al.

FOREIGN PATENT DOCUMENTS

| EP | 1316598 A1 | 6/2003 |
| WO | WO 1995/012622 A1 | 5/1995 |
| WO | WO 2009/103516 A2 | 8/2009 |

OTHER PUBLICATIONS

International Search Report dated Aug. 2, 2018 from PCT/EP2018/063599.

* cited by examiner

*Primary Examiner* — Edward J Cain
(74) *Attorney, Agent, or Firm* — Fay Sharpe LLP

(57) ABSTRACT

An adhesive polymer composition comprising a non-elastomeric copolymer of ethylene and one or more comonomers having 3 to 10 carbon atoms, and an elastomer is disclosed herein. The non-elastomeric copolymer is present in an amount of 60 to 95% by weight, based on the adhesive polymer composition, has a weight average molecular weight Mw of from 50 000 to 80 000 g/mol, molecular weight distribution Mw/Mn of 2.0 to 5.5, density of from 0.925 to 0.945 g/cm$^3$, and at most 0.1 vinyl groups/1000 carbon atoms. The non-elastomeric copolymer or the non-elastomeric copolymer and the elastomer have been grafted with an acid grafting agent.

15 Claims, No Drawings

ADHESIVE POLYMER COMPOSITION

This is a 371 of PCT/EP2018/063599, filed May 24, 2018, which claims priority to European Patent Application No. 17173681.2, filed May 31, 2017, the contents of which are fully incorporated herein by reference.

FIELD OF THE INVENTION

The present invention relates to an adhesive polymer composition comprising an acid grafted polyethylene and an elastomer, to an article comprising a layer of the adhesive polymer composition, in particular a multilayer pipe such as a coated metal pipe, and to the use of the adhesive polymer composition for the production of an adhesive layer, in particular an adhesive layer of a multilayer structure of a pipe such as a coated metal pipe.

PROBLEM TO BE SOLVED

Multilayer structures comprising two, three, four, five or more layers are known for many applications such as the protective coating of pipes. In these multilayer structures different layers most often consist of different materials which accordingly have different physical and chemical properties. This results in the problem that adjacent layers do not or only to an insufficient extent adhere to each other. Therefore, it is commonly known to build up multilayer structure with intermediate adhesive layers for improving the adhesion of adjacent layers consisting of different materials and thus avoid delamination.

For example, in the coating of metal pipes commonly a three-layer polymer structure is used. It consists of an epoxy layer which is designed to firmly adhere to the outer surface of the metal wall of the pipe, an intermediate adhesive layer and an outer polyolefin protective layer which commonly is a polyethylene or polypropylene. The three-layer structure shows improved properties compared to formerly known single-layer coatings. On the one hand, the epoxy layer shows an improved bonding to the metal wall, avoids cathodic disbondment and provides less oxygen penetration whereas on the other hand the outer polyolefin-based layer provides good mechanical protection, and less water penetration. However, to avoid delamination of the polyolefin layer and the epoxy layer which would result in damage of the multilayer coating an adhesive layer between both layers is necessary.

Adhesive layers and materials for the production of such layers are for example known from WO99/37730 A1 which discloses an adhesive composition comprising an ethylene copolymer component and from 2 to 35 wt % of a grafted metallocene polyethylene.

JP 8208915 A describes an adhesive polyethylene composition comprising a grafted ethylene/alpha-olefin copolymer as cover for e.g. cables and steel pipes.

EP 0896044 A1 relates to an adhesive resin composition, in particular used for laminates. The resin contains an alpha-olefin/aromatic vinyl compound random copolymer which is partially or wholly graft-modified.

EP 0791628 B1 provides an adhesive composition comprising a grafted long-chain branched ethylene-α-olefin copolymer with a tackifier or an ethylene-vinyl acetate copolymer for use as film layers in adhesion to e.g. metals.

EP 1316598 B1 discloses an adhesive polymer composition comprising an acid grafted polyethylene which has been produced using a single-site catalyst in an amount of at least 40 wt % of the composition.

WO 2009/103516 A2 discloses an adhesive polymer composition comprising an acid grafted polyethylene, which has a $M_w/M_n$ from 6 to 30, a density from 0.93 to 0.955 g/cm$^3$, $M_w$ from 20 000 to 500 000 g/mol, from 0.01 to 20 $CH_3$/1000 carbon atoms and at least 0.6 vinyl groups/1000 carbon atoms, in an amount of at least 50 wt % of the composition.

In spite of the prior art there still remains a need for adhesive polymer composition for use in the production of adhesive layers for multilayer structures with improved adhesion properties.

SUMMARY OF THE INVENTION

The present invention provides an adhesive polymer composition comprising
  a) a non-elastomeric copolymer of ethylene and one or more comonomers having 3 to 10 carbon atoms, which non-elastomeric copolymer is present in an amount of 60 to 95% by weight, based on the adhesive polymer composition, has a weight average molecular weight Mw of from 50 000 to 80 000 g/mol, molecular weight distribution Mw/Mn of 2.0 to 5.5, density of from 0.925 to 0.945 g/cm$^3$, and at most 0.1 vinyl groups/1000 carbon atoms, and
  b) an elastomer,
  wherein the non-elastomeric copolymer or the non-elastomeric copolymer and the elastomer have been grafted with an acid grafting agent.

The present invention also provides an article, in particular a multilayer pipe, comprising an adhesive layer which comprises the adhesive polymer composition.

The present invention also provides a use of the adhesive polymer composition for the production of an adhesive layer, preferably an adhesive layer of a pipe.

DETAILED DESCRIPTION

The inventive adhesive polymer composition shows improved adhesion properties, in particular when used as an adhesive layer. For example, the adhesive polymer composition when coextruded as an adhesive layer in the three-layer structure for coating of metal pipes shows improved peel strength values at 23° C.

The non-elastomeric copolymer of the inventive adhesive polymer composition is a non-elastomeric copolymer of ethylene and one or more α-unsaturated olefinic comonomer(s). Preferably the α-olefin comonomer(s) comprise(s) from 3 to 20 carbon atoms, more preferably from 2 to 12 carbon atoms and most preferably from 3 to 8 carbon atoms.

Examples of the α-olefin comonomers include propylene, 1-butene, 1-pentene, 1-hexene, 4-methyl-1-pentene, 1-octene, 1-decene, and mixtures thereof. Particularly preferred comonomers are 1-butene, 1-hexene and 1-octene.

Typically, the amount of comonomer within the non-elastomeric copolymer is from 1 to 30% by weight and more preferably is from 1 to 5% by weight.

The non-elastomeric copolymer is present in an amount of 60 to 95% by weight based on the adhesive polymer composition. In a further preferred embodiment the non-elastomeric copolymer is present in an amount of 70 to 90% by weight based on the adhesive polymer composition.

The non-elastomeric copolymer has a weight average molecular weight Mw of from 40 000 to 90 000 g/mol, more preferably from 50 000 to 80 000 g/mol.

The non-elastomeric copolymer has a molecular weight distribution Mw/Mn of 2.0 to 5.5, more preferably 2.5 to 5.0.

The non-elastomeric copolymer has a density of from 0.920 to 0.950 g/cm$^3$, more preferably from 0.925 to 0.945 g/cm$^3$, and even more preferably from 0.930 to 0.942 g/cm$^3$.

The non-elastomeric copolymer has from 0 to 0.1 vinyl groups/1000 carbon atoms, more preferably from 0.01 to 0.07 vinyl groups/1000 carbon atoms.

The non-elastomeric copolymer can be free of long chain branches or have long chain branches. Typically, the amount of long chain branches depends on the catalyst and on the process conditions employed. The term 'long chain branches' refers to branches produced by polymerisation conditions but not to branches introduced by polymerisable comonomer species.

The non-elastomeric copolymer can be produced in a process comprising any catalyst known in the art, more preferably any single-site catalyst known in the art.

It is also possible that the non-elastomeric copolymer is produced in a process comprising a mixture of a single-site catalyst and another catalyst of the same or different nature. In the case of a mixture of a single-site catalyst and a catalyst of a different nature, it is preferred that at least 90% of the non-elastomeric copolymer of the adhesive polymer composition is produced by a single-site catalyst.

Preferably, the non-elastomeric copolymer is produced in a process comprising a metallocene catalyst. Further preferred, the catalyst comprises a metallocene component on a support and an alumoxane component.

Any known process may be used, e.g. slurry, gas phase or solution process or a combination of the above mentioned processes for preparation of the non-elastomeric copolymer.

Further typically, the non-elastomeric copolymer may be produced in a slurry process, for example as disclosed in U.S. Pat. No. 3,248,179 A.

The polymerisation steps may be preceded by a prepolymerisation step. The prepolymerisation step may be conducted in a loop reactor. The prepolymerisation is then preferably conducted in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. The temperature in the prepolymerisation step is typically from 0 to 90° C., preferably from 20 to 80° C. and more preferably from 50 to 75° C. The pressure is not critical and is typically from 1 to 150 bar, preferably from 40 to 80 bar. The amount of ethylene fed during prepolymerisation step is typically from 100 to 6000 g/h, preferably from 2000 to 4000 g/h. 1-Butene is added as comonomer and the amount of comonomer fed during prepolymerisation step is from 10 g/h to 400 g/h, preferably from 50 g/h to 200 g/h. Hydrogen amount during prepolymerisation is varied from 0 to 2 g/h, preferably from 0 to 0.4 g/h.

The polymerisation stage is preferably conducted as a slurry polymerisation. The polymerisation step may be conducted in a loop reactor. The slurry polymerisation usually takes place in an inert diluent, typically a hydrocarbon diluent such as methane, ethane, propane, n-butane, isobutane, pentanes, hexanes, heptanes, octanes etc., or their mixtures. Preferably the diluent is a low-boiling hydrocarbon having from 1 to 4 carbon atoms or a mixture of such hydrocarbons. An especially preferred diluent is propane, possibly containing minor amount of methane, ethane and/or butane. The ethylene content in the fluid phase of the slurry may be from 1 to about 50% by mole, preferably from about 2 to about 20% by mole and in particular from about 2 to about 10% by mole. The temperature in the polymerisation stage is typically from 60 to 100° C., preferably from 70 to 90° C. The pressure is from 1 to 150 bar, preferably from 40 to 80 bar. The amount of hydrogen needed to reach the desired MFR depends on the catalyst used and the polymerisation conditions. Hydrogen to ethylene molar ratio during polymerisation is typically from 0 to 4 g/h, preferably from 0 to 1 g/h. The amount of comonomer needed to reach the desired density depends on the comonomer type, the catalyst used and the polymerisation conditions.

In the inventive adhesive polymer composition the elastomer is an elastomeric ethylene copolymer. The elastomer may be ethylene propylene rubber (EPR), ethylene α-olefin elastomer or plastomer or ethylene propylene diene monomer rubber (EPDM). Preferably the elastomer comprises an elastomeric copolymer of ethylene with one or more polar monomer(s). Preferred examples of such elastomers are ethylene-alkyacrylates and ethylene-alkylacetates. Further preferred, the comonomer has a polar moiety of the formula —O(CO)C$_1$-C$_6$-alkyl or —C(O)—OC$_1$-C$_6$-alkyl. Particularly preferred elastomers are ethylenevinylacetate (EVA), ethylenemethylacrylate (EMA), ethylenemethylmethacrylate (EMMA), ethylenepropylacrylate and ethylenebutylacrylate (EBA), in particular EBA.

The elastomer may be made by any process known in the art also including processes comprising a single-site catalyst. Acrylate copolymers are produced in a free-radical process.

As acid grafting agent, any such agent can be used which is known to be suitable for this purpose by the person skilled in the art.

Preferably, the acid grafting agent is an unsaturated carboxylic acid or a derivative thereof such as anhydrides, esters and salts (both metallic and non-metallic). Preferably, the unsaturated group is in conjugation with the carboxylic group. Examples of such grafting agents include acrylic acid, methacrylic acid, fumaric acid, maleic acid, nadic acid, citraconic acid, itaconic acid, crotonic acid, and their anhydrides, metal salts, esters amides or imides. The preferred grafting agents are maleic acid, its derivatives such as maleic anhydride, and in particular maleic anhydride.

Grafting can be carried out by any process known in the art such as grafting in a melt without a solvent or in solution or dispersion or in a fluidised bed. Typically, grafting is performed in a heated extruder or mixer as e.g. described in U.S. Pat. Nos. 3,236,917 A, 4,639,495 A, 4,950,541 A or U.S. Pat. No. 5,194,509 A. The contents of these documents are herein included by reference. Typically, grafting is carried out in a twin screw extruder such as described in U.S. Pat. No. 4,950,541 A.

Grafting may be carried out in the presence or absence of a radical initiator but is preferably carried out in the presence of a radical initiator such as an organic peroxide, organic perester or organic hydroperoxide.

The amount of said acid grafting agent added to the adhesive polymer composition before grafting is preferably from 0.01 to 3.0 parts by weight, more preferably from 0.03 to 1.5 parts by weight based on the adhesive polymer composition.

Grafting may be applied either to the non-elastomeric copolymer or to the blend of non-elastomeric copolymer and elastomer. Preferably, grafting is applied to the blend of non-elastomeric copolymer and elastomer.

Preferably the non-elastomeric copolymer before grafting has a melt flow rate MFR$_2$ of from 1 to 20 g/min, more preferably of from 1 to 10 g/min.

The non-elastomeric copolymer can be a unimodal or a multimodal polyethylene. Preferably the non-elastomeric copolymer is a unimodal polyethylene.

The expression 'modality of a polymer' refers to the form of its molecular weight distribution (MWD) curve, i.e. the appearance of the graph of the polymer weight fraction as a function of its molecular weight. If the polymer is produced in one reactor or several reactors having similar conditions all over the reactor (s), only one type of polymer is produced with a single-site catalyst. In that case, the produced polymer is unimodal.

In a preferred embodiment the adhesive polymer composition has an $MFR_2$ value (after grafting) of from 0.1 to 10 g/min, more preferably from 1.0 to 6.0 g/min.

The adhesive polymer composition has a density of from 0.925 to 0.945 g/cm$^3$, more preferably from 0.930 to 0.940 g/cm$^3$.

The adhesive polymer composition comprises the non-elastomeric copolymer and the elastomer as described above. In addition to these components, conventional additives may also be present in the adhesive polymer composition in small amounts, preferably up to at most 4% by weight. For example, an antioxidant may be present in the adhesive polymer composition in an amount of at most 10 000 ppm, more preferably at most 5 000 ppm and most preferably at most 3 000 ppm.

It is preferred that the adhesive polymer composition apart from the conventional additives consists of the non-elastomeric copolymer and the elastomer, i.e. that no further polymer components before or after grafting are added. Conventional additives may be added before or after grafting.

The adhesive polymer composition of this invention is most useful as co-extrudable adhesive, but other applications are not excluded.

The present invention also relates to an article which comprises an adhesive layer comprising the adhesive polymer composition as described above. Such articles e.g. comprise pipes, cables, films, articles made by extrusion coating and articles used in engineering applications. In the latter, the adhesive polymer composition may also be used to provide compatibility between various layers or parts.

In a preferred embodiment, the adhesive layer in the article is adjacent to a polyolefin layer. The present invention in particular relates to a multilayer pipe, i.e. a pipe comprising a multilayer coating with two, three, four, five or more layers, which comprises a polyolefin layer and an adhesive layer adjacent to the polyolefin layer which comprises the inventive adhesive polymer composition as described above.

In a preferred embodiment, the present invention also relates to a coated metal pipe, comprising a polyolefin layer and a layer of a polar polymer, in particular an epoxy layer, wherein between the layers an adhesive layer is present which comprises the adhesive polymer composition according to any of the above described embodiments. In particular, the present invention also relates to a metal pipe with an three-layer protective coating consisting of an inner epoxy layer, an intermediate adhesive layer comprising the inventive adhesive polymer composition and an outer polyolefin layer such as a polyethylene or polypropylene layer.

Furthermore, the present invention relates to the use of the adhesive polymer composition as described above for the production of an adhesive layer. Preferably, the present invention further relates to the use of the adhesive polymer composition for the production of an adhesive layer in an article as e.g. a pipe, a cable, a film, an article made by extrusion coating and articles used in engineering applications. In these latter articles, the adhesive polymer composition may also be used to provide compatibility between various layers or parts.

In a preferred embodiment, the present invention also relates to the use of the adhesive polymer composition for the production of an adhesive layer of a pipe. In particular, the present invention also relates to the use of the adhesive polymer composition for the production of an adhesive layer of the coating of a metal pipe with a three-layer protective coating as described above.

In the production of coated metal pipes having a three-layer coating preferably the epoxy layer is produced first by spraying epoxy in powder or liquid form, in one or two component form, onto the heated outer surface of the metal wall. Thereby, the epoxy forms a thin layer which firmly adheres to the metal surface. Subsequently, the adhesive and the outer polyolefin layer which preferably is a polyethylene or polypropylene layer are co-extruded onto the epoxy layer. The adhesive can also be applied by spraying the adhesive in a powder form onto the epoxy layer.

Methods

Melt Index

The melt flow rate (MFR) is determined under a load of 2.16 kg at 190° C. according to ISO 1133-1 method B and is indicated in g/10 min.

Density

Density of the polymer is measured according to ISO 1183-1 Method A using compression moulded samples.

Quantification of Microstructure by NMR Spectroscopy: Ethylene-Butene and Ethylene-Hexene Comonomers Quantitative nuclear-magnetic resonance (NMR) spectroscopy was used to quantify the comonomer content of the polymers.

Quantitative $^{13}C\{^1H\}$ NMR spectra recorded in the molten-state using a Bruker Avance III 500 NMR spectrometer operating at 500.13 and 125.76 MHz for $^1H$ and $^{13}C$ respectively. All spectra were recorded using a $^{13}C$ optimised 7 mm magic-angle spinning (MAS) probehead at 150° C. using nitrogen gas for all pneumatics. Approximately 200 mg of material was packed into a 7 mm outer diameter zirconia MAS rotor and spun at 4 kHz. This setup was chosen primarily for the high sensitivity needed for rapid identification and accurate quantification (Klimke, K., Parkinson, M., Piel, C., Kaminsky, W., Spiess, H. W., Wilhelm, M., Macromol. Chem. Phys. 2006; 207:382., Parkinson, M., Klimke, K., Spiess, H. W., Wilhelm, M., Macromol. Chem. Phys. 2007; 208:2128., Castignolles, P., Graf, R., Parkinson, M., Wilhelm, M., Gaborieau, M., Polymer 50 (2009) 2373). Standard single-pulse excitation was employed utilising the transient NOE at short recycle delays of 3s (Pollard, M., Klimke, K., Graf, R., Spiess, H. W., Wilhelm, M., Sperber, O., Piel, C., Kaminsky, W., Macromolecules 2004;37:813., Klimke, K., Parkinson, M., Piel, C., Kaminsky, W., Spiess, H. W., Wilhelm, M., Macromol. Chem. Phys. 2006; 207:382.) and the RS-HEPT decoupling scheme (Filip, X., Tripon, C., Filip, C., J. Mag. Resn. 2005, 176, 239, Griffin, J. M., Tripon, C., Samoson, A., Filip, C., and Brown, S. P., Mag. Res. in Chem. 2007 45, S1, S198). A total of 1024 (1 k) transients were acquired per spectrum. This setup was chosen due its high sensitivity towards low comonomer contents.

Quantitative $^{13}C\{^1H\}$ NMR spectra were processed, integrated and quantitative properties determined using custom spectral analysis automation programs. All chemical shifts are internally referenced to the bulk methylene signal (δ+) at 30.00 ppm (J. Randall, Macromol. Sci., Rev. Macromol. Chem. Phys. 1989, C29, 201).

Comonomer Content Quantification in Ethylene-Butene Copolymers:

Characteristic signals corresponding to the incorporation of 1-butene were observed (J. Randall, Macromol. Sci., Rev. Macromol. Chem. Phys. 1989, C29, 201.) and all contents calculated with respect to all other monomers present in the polymer.

Characteristic signals resulting from isolated 1-butene incorporation i.e. EEBEE comonomer sequences, were observed. Isolated 1-butene incorporation was quantified using the integral of the signal at 39.84 ppm assigned to the *B2 sites, accounting for the number of reporting sites per comonomer:

$$B = I_{*B2}$$

When characteristic signals resulting from consecutive 1-butene incorporation i.e. EBBE comonomer sequences were observed, such consecutive 1-butene incorporation was quantified using the integral of the signal at 39.4 ppm assigned to the ααB2B2 sites accounting for the number of reporting sites per comonomer:

$$BB = 2*I_{\alpha\alpha B2B2}$$

When characteristic signals resulting from non consecutive 1-butene incorporation i.e. EBEBE comonomer sequences were also observed, such non-consecutive 1-butene incorporation was quantified using the integral of the signal at 24.7 ppm assigned to the ββB2B2 sites accounting for the number of reporting sites per comonomer:

$$BEB = 2*I_{\beta\beta B2B2}$$

Due to the overlap of the *B2 and *βB2B2 sites of isolated (EEBEE) and non-consecutivly incorporated (EBEBE) 1-butene respectively the total amount of isolated 1-butene incorporation is corrected based on the amount of non-consecutive 1-butene present:

$$B = I_{*B2} - 2*I_{\beta\beta B2B2}$$

With no other signals indicative of other comonomer sequences, i.e. butene chain initiation, observed the total 1-butene comonomer content was calculated based solely on the amount of isolated (EEBEE), consecutive (EBBE) and non-consecutive (EBEBE) 1-butene comonomer sequences:

$$B_{total} = B + BB + BEB$$

Characteristic signals resulting from saturated end-groups were observed. The content of such saturated end-groups was quantified using the average of the integral of the signals at 22.84 and 32.23 ppm assigned to the 2s and 3s sites respectively:

$$S = (1/2)*(I_{2S} + I_{3S})$$

The relative content of ethylene was quantified using the integral of the bulk methylene (δ+) signals at 30.00 ppm:

$$E = (1/2)*I_{\delta+}$$

The total ethylene comonomer content was calculated based the bulk methylene signals and accounting for ethylene units present in other observed comonomer sequences or end-groups:

$$E_{total} = E + (5/2)*B + (7/2)*BB + (9/2)*BEB + (3/2)*S$$

The total mole fraction of 1-butene in the polymer was then calculated as:

$$fB = (B_{total}/(E_{total} + B_{total}))$$

The total comonomer incorporation of 1-butene in mole percent was calculated from the mole fraction in the usual manner:

$$B[mol\%] = 100*fB$$

The total comonomer incorporation of 1-butene in weight percent was calculated from the mole fraction in the standard manner:

$$B[wt\%] = 100*(fB*56.11)/((fB*56.11) + ((1-fB)*28.05))$$

Comonomer Content Quantification in Ethylene-Hexene Copolymers:

Characteristic signals corresponding to the incorporation of 1-hexene were observed (J. Randall, Macromol. Sci., Rev. Macromol. Chem. Phys. 1989, C29, 201.) and all contents calculated with respect to all other monomers present in the polymer.

Characteristic signals resulting from isolated 1-hexene incorporation i.e. EEHEE comonomer sequences, were observed. Isolated 1-hexene incorporation was quantified using the integral of the signal at 38.29 ppm assigned to the *B4 sites, accounting for the number of reporting sites per comonomer:

$$H = I_{*B4}$$

When characteristic signals resulting from consecutive 1-hexene incorporation, i.e. EHHE comonomer sequences were observed, such consecutive 1-hexene incorporation was quantified using the integral of the signal at 40.46 ppm assigned to the ααB4B4 sites accounting for the number of reporting sites per comonomer:

$$HH = 2*I_{\alpha\alpha B4B4}$$

When characteristic signals resulting from non consecutive 1-hexene incorporation, i.e. EHEHE comonomer sequences were observed, such non-consecutive 1-hexene incorporation was quantified using the integral of the signal at 24.7 ppm assigned to the ββB4B4 sites accounting for the number of reporting sites per comonomer:

$$HEH = 2*I_{\beta\beta B4B4}$$

Due to the overlap of the signals from the *B4 and *βB4B4 sites from isolated (EEHEE) and non-consecutivly incorporated (EHEHE) 1-hexene respectively the total amount of isolated 1-hexene incorporation is corrected based on the amount of non-consecutive 1-hexene present:

$$H = I_{*B4} - 2*I_{\beta\beta B4B4}$$

With no other signals indicative of other comonomer sequences, i.e. 1-hexene chain initiation, observed the total 1-hexene comonomer content was calculated based solely on the amount of isolated (EEHEE), consecutive (EHHE) and non-consecutive (EHEHE) 1-hexene comonomer containing sequences:

$$H_{total} = H + HH + HEH$$

Characteristic signals resulting from saturated end-groups were observed. The content of such saturated end-groups was quantified using the average of the integral of the signals at 22.84 and 32.23 ppm assigned to the 2s and 3s sites respectively:

$$S = (1/2)*(I_{2S} + I_{3S})$$

The relative content of ethylene was quantified using the integral of the bulk methylene (δ+) signals at 30.00 ppm:

$$E = (1/2)*I_{\delta+}$$

The total ethylene comonomer content was calculated based the bulk methylene signals and accounting for ethylene units present in other observed comonomer sequences or end-groups:

$$E_{total}=E+(5/2)*H+(7/2)*HH+(9/2)*H\ EH+(3/2)*S$$

The total mole fraction of 1-hexene in the polymer was then calculated as:

$$fH=(H_{total})/(E_{total}+H_{total})$$

The total comonomer incorporation of 1-hexene in mole percent was calculated from the mole fraction in the usual manner:

$$H[\text{mol }\%]=100*fH$$

The total comonomer incorporation of 1-hexene in weight percent was calculated from the mole fraction in the standard manner:

$$H[\text{wt }\%]=100*(fH*84.16)/((fH*84.16)+((1-fH)*28.05))$$

Molecular Weight Averages, Molecular Weight Distribution ($M_n$, $M_w$, $M_z$, MWD)

Molecular weight averages ($M_z$, $M_w$ and $M_n$), Molecular weight distribution (MWD) and its broadness, described by polydispersity index, PDI=$M_w/M_n$ (wherein $M_n$ is the number average molecular weight and $M_w$ is the weight average molecular weight) were determined by Gel Permeation Chromatography (GPC) according to ISO 16014-1:2003, ISO 16014-2:2003, ISO 16014-4:2003 and ASTM D 6474-12 using the following formulas:

$$M_n = \frac{\sum_{i=1}^{N} A_i}{\sum_{i=1}^{N} (A_i/M_i)} \quad (1)$$

$$M_w = \frac{\sum_{i=1}^{N} (A_i \times M_i)}{\sum_{i=1}^{N} A_i} \quad (2)$$

$$M_z = \frac{\sum_{i=1}^{N} (A_i \times M_i^2)}{\sum_{i=1}^{N} (A_i \times M_i)} \quad (3)$$

For a constant elution volume interval $\Delta V_i$ where $A_i$ and $M_i$ are the chromatographic peak slice area and polyolefin molecular weight (Mw), respectively associated with the elution volume, $V_i$, where N is equal to the number of data points obtained from the chromatogram between the integration limits. Peak Integration was performed according to ISO 16017-1:2003, which means that oil and antioxidant peaks below 1000 g/mol are not included into the calculation of the MWD.

A high temperature GPC instrument, equipped with an infrared (IR) detector (IR5) from PolymerChar (Valencia, Spain), equipped with 3× Agilent-PLgel Olexis and 1× Agilent-PLgel Olexis Guard columns was used. As the solvent and mobile phase 1,2,4-trichlorobenzene (TCB) stabilized with 250 mg/L 2,6-Di tert butyl-4-methyl-phenol) was used. The chromatographic system was operated at 160° C. and at a constant flow rate of 1 mL/min. 200 μL of sample solution was injected per analysis. Data collection was performed using PolymerChar GPCone software.

The column set was calibrated using universal calibration (according to ISO 16014-2:2003) with 19 narrow MWD polystyrene (PS) standards in the range of 0.5 kg/mol to 11 500 kg/mol. The PS standards were dissolved at 160° C. for 15 min. The conversion of the polystyrene peak molecular weight to polyolefin molecular weights is accomplished by using the Mark Houwink equation and the following Mark Houwink constants:

$$K_{PS}=19\times10^{-3}\text{ mL/g}, \alpha_{PS}=0.655$$

$$K_{PE}=39\times10^{-3}\text{ mL/g}, \alpha_{PE}=0.725$$

$$K_{PP}=19\times10^{-3}\text{ mL/g}, \alpha_{PP}=0.725$$

A third order polynomial fit was used to fit the calibration data.

All samples were prepared in the concentration range of 0.5-1 mg/ml and dissolved at 160° C. for 3 hours under continuous gentle shaking.

Peel Strength

Peel strength designates the relative strength of the bonding between epoxy layer and adhesive layer. The peel strength of the coating compositions was measured at 23° C. according to ISO21809-1:2011 using a Zwick Roell tensile testing machine, with the following alterations to the method: The peel strength was recorded for three minutes, after which the mean value of the peel strength recorded over these three minutes was calculated. The mean value corresponds to the reported peel strength of the composition.

Unsaturation

Quantitative nuclear-magnetic resonance (NMR) spectroscopy was used to quantify the content of unsaturated groups present in the polymers.

Quantitative $^1$H NMR spectra recorded in the solution-state using a Bruker Avance III 400 NMR spectrometer operating at 400.15 MHz. All spectra were recorded using a $^{13}$C optimised 10 mm selective excitation probehead at 125° C. using nitrogen gas for all pneumatics. Approximately 250 mg of material was dissolved in 1,2-tetrachloroethane-$d_2$ (TCE-$d_2$) using approximately 3 mg of Hostanox 03 (CAS 32509-66-3) as stabiliser. Standard single-pulse excitation was employed utilising a 30 degree pulse, a relaxation delay of 10 s and 10 Hz sample rotation. A total of 128 transients were acquired per spectra using 4 dummy scans. This setup was chosen primarily for the high resolution needed for unsaturation quantification and stability of the vinylidene groups. (He, Y., Qiu, X, and Zhou, Z., Mag. Res. Chem. 2010, 48, 537-542., Busico, V. et. al. Macromolecules, 2005, 38 (16), 6988-6996) All chemical shifts were indirectly referenced to TMS at 0.00 ppm using the signal resulting from the residual protonated solvent at 5.95 ppm.

Characteristic signals corresponding to the presence of terminal aliphatic vinyl groups (R—CH═CH$_2$) were observed and the amount quantified using the integral of the two coupled inequivalent terminal CH$_2$ protons (Va and Vb) at 4.95, 4.98 and 5.00 and 5.05 ppm accounting for the number of reporting sites per functional group:

$$N\text{vinyl}=IVab/2$$

Characteristic signals corresponding to the presence of internal vinylidene groups (RR'C═CH$_2$) were observed and the amount quantified using the integral of the two CH$_2$ protons (D) at 4.74 ppm accounting for the number of reporting sites per functional group:

$$N\text{vinylidene}=ID/2$$

When characteristic signals corresponding to the presence of internal cis-vinylene groups (E-RCH=CHR'), or related structure, were observed, then the amount quantified using the integral of the two CH protons (C) at 5.39 ppm accounting for the number of reporting sites per functional group:

$Ncis=IC/2$

When characteristic signals corresponding to the presence of internal cis-vinylene groups (E-RCH=CHR'), or related structure, were not visually observed, then these groups were not counted and the parameter Ncis was not used.

Characteristic signals corresponding to the presence of internal trans-vinylene groups (Z-RCH=CHR') were observed and the amount quantified using the integral of the two CH protons (T) at 5.45 ppm accounting for the number of reporting sites per functional group:

$Ntrans=IT/2$

Characteristic signals corresponding to the presence of internal trisubstituted-vinylene groups (RCH=CR'R"), or related structure, were observed and the amount quantified using the integral of the CH proton (Tris) at 5.14 ppm accounting for the number of reporting sites per functional group:

$Ntris=ITris$

The Hostanox 03 stabliser was quantified using the integral of multiplet from the aromatic protons (A) at 6.92, 6.91, 6.69 and at 6.89 ppm and accounting for the number of reporting sites per molecule:

$H=IA/4$

As is typical for unsaturation quantification in polyolefins the amount of unsaturation was determined with respect to total carbon atoms, even though quantified by $^1H$ NMR spectroscopy. This allows direct comparison to other microstructure quantities derived directly from $^{13}C$ NMR spectroscopy.

The total amount of carbon atoms was calculated from integral of the bulk aliphatic signal between 2.85 and −1.00 ppm with compensation for the methyl signals from the stabiliser and carbon atoms relating to unsaturated functionality not included by this region:

$NCtotal=(Ibulk-42*H)/2+2*Nvinyl+2*Nvinylidene+2*Ncis+2*Ntrans+2*Ntris$

The content of unsaturated groups (Ux) was calculated as the number of unsaturated groups in the polymer per thousand total carbons (kCHn):

$Ux=1000*Nx/NCtotal$

In particular, the content of vinyl groups Uvinyl was calculated as the number of vinyl groups in the polymer per thousand carbons (kCHn):

$Uvinyl=1000*Nvinly/NCtotal$

EXAMPLES

Polyethylene A (Inventive)

A medium density polyethylene was produced using a single-site catalyst. As catalyst was used alumoxane containing, supported catalyst containing metallocene bis(1-methyl-3-n-butylcyclopentadienyl) zirconium (IV) chloride and with enhanced ActivCat® activator technology from Albemarle Corporation.

A prepolymerisation was carried out in a first slurry loop reactor followed with a polymerisation in a second slurry loop reactor. Polymerisation conditions can be found in Table 1.

TABLE 1

| Prepolymerisation Reactor | |
|---|---|
| Temperature (° C.) | 50.0 |
| Pressure (bar) | 57.1 |
| Ethylene feed (kg/h) | 2.0 |
| 1-Butene Feed (g/h) | 201.0 |
| Loop Reactor | |
| Temperature (° C.) | 85.0 |
| Pressure (bar) | 55.0 |
| Ethylene Concentration (mol-%) | 4.7 |
| 1-Butene/Ethylene ratio (mol/kmol) | 98.0 |
| Propane feed (kg/h) | 92.3 |
| Density by balance, plaque (g/cm³) | 0.938 |
| MFR2 (g/10 min) | 5.3 |
| Pellet | |
| MFR2 (g/10 min) | 5.4 |
| Density (g/cm³) | 0.939 |

Polyethylene B (Comparative)

A medium density polyethylene was produced using a single-site catalyst prepared according to example 1 of WO 95/12622 A1. The polymerisation was carried out according to Example 1 of EP 1316598 B1.

Polyethylene C (Comparative)

A medium density polyethylene was produced using a mixed iron catalyst and a single-site catalyst. The catalysts were prepared and polymerisation carried out according to Example 4 of WO 2009/103516 A2.

Properties of inventive and comparative polyethylenes are summarised in Table 2.

TABLE 2

| | Polyethylene A (inventive) | Polyethylene B (comparative) | Polyethylene C (comparative) |
|---|---|---|---|
| Density (g/cm³) | 0.939 | 0.934 | 0.936 |
| MFR₂ (g/10 min) | 5.4 | 6.0 | 2.5 |
| Mn (g/mol) | 14 750 | | |
| Mw (g/mol) | 67 550 | | 95 693 |
| Mz (g/mol) | 134 000 | | 280 975 |
| Mw/Mn | 2.8 | | 8.9 |
| Comonomer (wt %) | C₄ 1.5 | | C₆ 5.6 |
| Vinyl/kCH$_n$ | 0.04 | | 1.08 |

Compositions 1 and 2 (Inventive)

The adhesive blend compositions were grafted in Werner & Pfleiderer ZSK 30 mm co-rotating twin-screw extruder. Polyethylene A was used for compositions 1 and 2. The adhesive blend compositions are shown in Table 3.

The ethylene butyl acrylate elastomer, which has a density of 0.926 g/cm³, MFR₂ of 4.5 g/10 min and butyl acrylate content of 27 wt %, was added to improve flexibility. The graft was achieved by adding various amounts of maleic anhydride. The peroxide initiator (Perkadox 14S-fl, Akzo Nobel) was fed as a 10% isododecane solution. The temperature in the extruder was varied between 170 and 210° C. and the screw speed was set at 200 rpm.

Composition 3 (Comparative)

Composition 3 was prepared according to Example 2, Composition 2 of EP 1316598 B1.

Composition 4 (Comparative)

Polyethylene C was used for composition 4. Composition 4 was prepared according to Example 6 of WO 2009/103516 A2.

TABLE 3

| | Composition 1 (inventive) | Composition 2 (inventive) | Composition 3 (comparative) | Composition 4 (comparative) |
|---|---|---|---|---|
| Polyethylene (wt %) | 77.1 | 73.1 | 69.2 | 55.0 + 14.9 (grafted) |
| Ethylene butyl acrylate elastomer (wt %) | 22.0 | 26.0 | 29.7 | 30.0 |
| Maleic Anhydride (wt %) | 0.40 | 0.40 | 0.50 | 0.08 |
| Peroxide solution (wt %) | 0.5 | 0.5 | 0.5 | |
| Antioxidant (wt %) | none | None | 0.1 | |

Processing of Compositions 1-2

Table 4 shows properties of the grafted adhesive blend compositions and adhesion properties of co-extrudable adhesives coated on steel pipes.

Epoxy powder was sprayed on as corrosion protection, where the temperature of the rotating steel pipeline (8m/min) was 200-220° C. The adhesive blend composition and the conventional high-density polyethylene outer layer were co-extruded onto the epoxy layer. The co-extrusion was performed with KrausMaffei 45 mm and Barmag 45 mm single screw extruders. The temperature of the adhesive blend composition and the high-density polyethylene at the respective dies was ca 220° C. Both the adhesive blend composition and high-density polyethylene layer are rolled tightly onto the coating surface with a silicone pressure roller. Thickness value for the epoxy layer was 145 μm, the adhesive blend composition 430 μm, and the polyethylene outer layer 4.0 mm. The cooled three layer composition was evaluated by measuring its peel strength with a Zwick Roell tensile testing machine.

Processing of Composition 3

Processing of composition 3 was done according to Example 3 of EP 1316598 B1.

Processing of Composition 4

Coating of a steel plate and measuring of peel strength were done according to examples of WO 2009/103516 A2.

TABLE 4

| | Composition 1 (inventive) | Composition 2 (inventive) | Composition 3 (comparative) | Composition 4 (comparative) |
|---|---|---|---|---|
| $MFR_2$ (g/10 min) | 1.2 | 1.1 | 1.2 | 1.9 |
| Density (g/cm³) | (Not measured) | 0.935 | 0.934 | 0.931 |
| Peel strength at 23° C. (N/cm) | 568 | 580 | 468 | 540 |

The peel strength at 23° C. of the grafted blend compositions 1 and 2 are better compared to the compositions of the comparative examples.

The invention claimed is:

1. An adhesive polymer composition comprising
   a) a non-elastomeric copolymer of ethylene and one or more comonomers having 3 to 10 carbon atoms, which non-elastomeric copolymer is present in an amount of 60 to 95% by weight, based on the adhesive polymer composition, has a weight average molecular weight Mw of from 50 000 to 80 000 g/mol, molecular weight distribution Mw/Mn of 2.0 to 5.5, density of from 0.925 to 0.945 g/cm³, and at most 0.1 vinyl groups/1000 carbon atoms, and
   b) an elastomer,
   wherein the non-elastomeric copolymer or the non-elastomeric copolymer and the elastomer have been grafted with an acid grafting agent.

2. The adhesive polymer composition according to claim 1, wherein the non-elastomeric copolymer is present in an amount of 70 to 90% by weight based on the adhesive polymer composition.

3. The adhesive polymer composition according to claim 1, wherein the non-elastomeric copolymer has an $MFR_2$ of from 1 to 20 g/10 min, more preferably from 1 to 10 g/10 min.

4. The adhesive polymer composition according to claim 1 wherein said component a) has a density of from 0.930 to 0.942 g/cm³.

5. The adhesive polymer composition according to claim 1, wherein the non-elastomeric copolymer is a polyethylene with unimodal molecular weight distribution.

6. The adhesive polymer composition according to claim 1, wherein the non-elastomeric copolymer has been produced in a process using a single-site catalyst.

7. The adhesive polymer composition according to claim 1, wherein the single-site catalyst comprises a metallocene component on a support and an alumoxane component.

8. The adhesive polymer composition according to claim 1, wherein the adhesive polymer composition has an $MFR_2$ value of from 0.1 to 10 g/10 min, preferably from 1.0 to 6.0 g/m in.

9. The adhesive polymer composition according to claim 1, wherein the adhesive polymer composition has a density of from 0.925 to 0.945 g/cm³, more preferably from 0.930 to 0.940 g/cm³.

10. The adhesive polymer composition according to claim 1, wherein the acid grafting agent is an unsaturated carboxylic acid or a derivative thereof, more preferably maleic acid or a derivative thereof, in particular maleic anhydride.

11. The adhesive polymer composition according to claim 1, wherein the acid grafting agent is present in an amount of from 0.01 to 3.0 parts by weight, more preferably from 0.03 to 1.5 parts by weight based on the adhesive polymer composition.

12. The adhesive polymer composition according to claim 1, wherein the elastomer comprises an elastomeric ethylene copolymer.

13. The adhesive polymer composition according to claim 1, wherein the elastomer comprises an elastomeric ethylene copolymer with polar comonomer groups.

14. An article, in particular a multilayer pipe, comprising an adhesive layer which comprises the adhesive polymer composition according to of the preceding claims.

15. Use of the adhesive polymer composition according to claim 1 for the production of an adhesive layer, preferably an adhesive layer of a pipe.

* * * * *